UNITED STATES PATENT OFFICE.

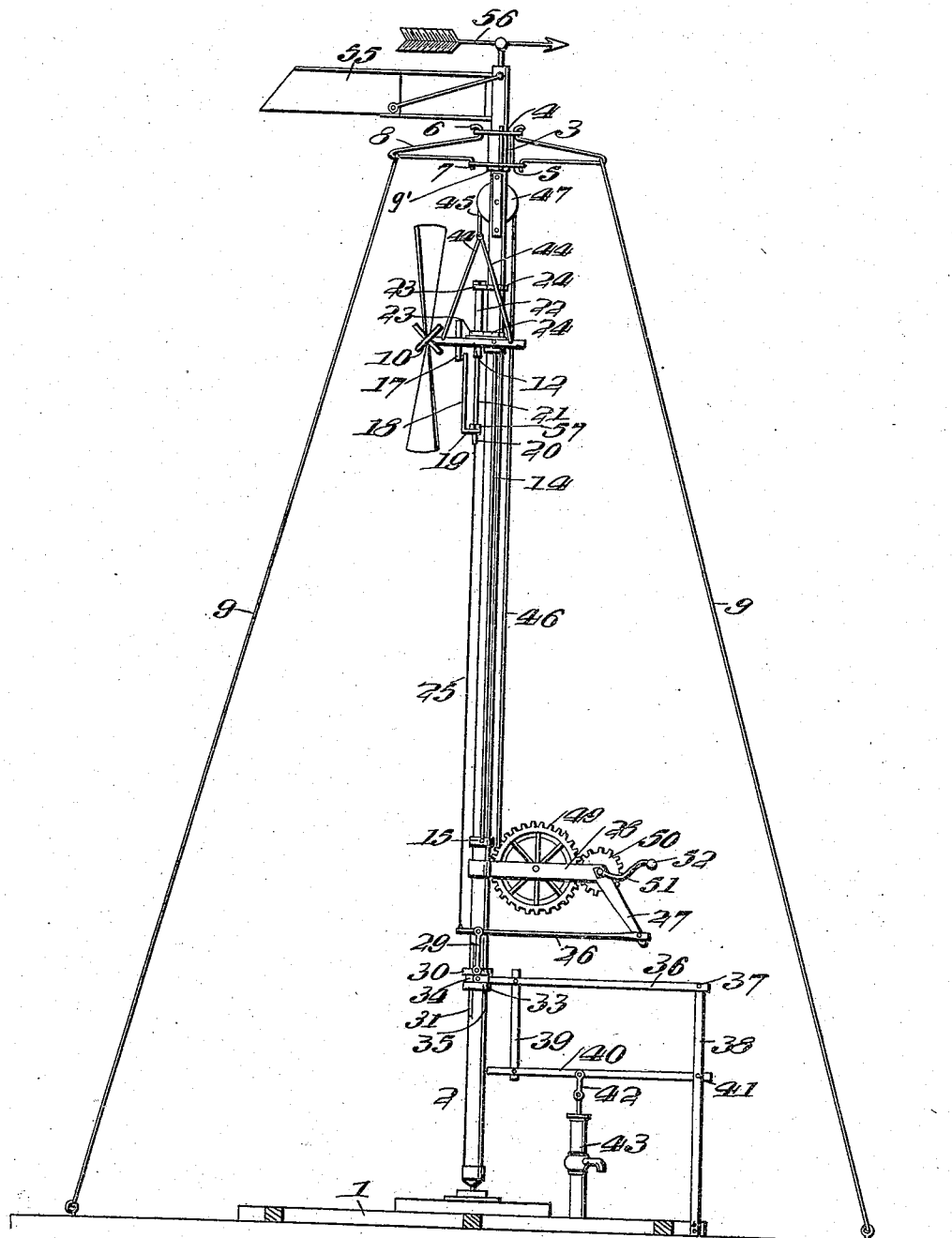

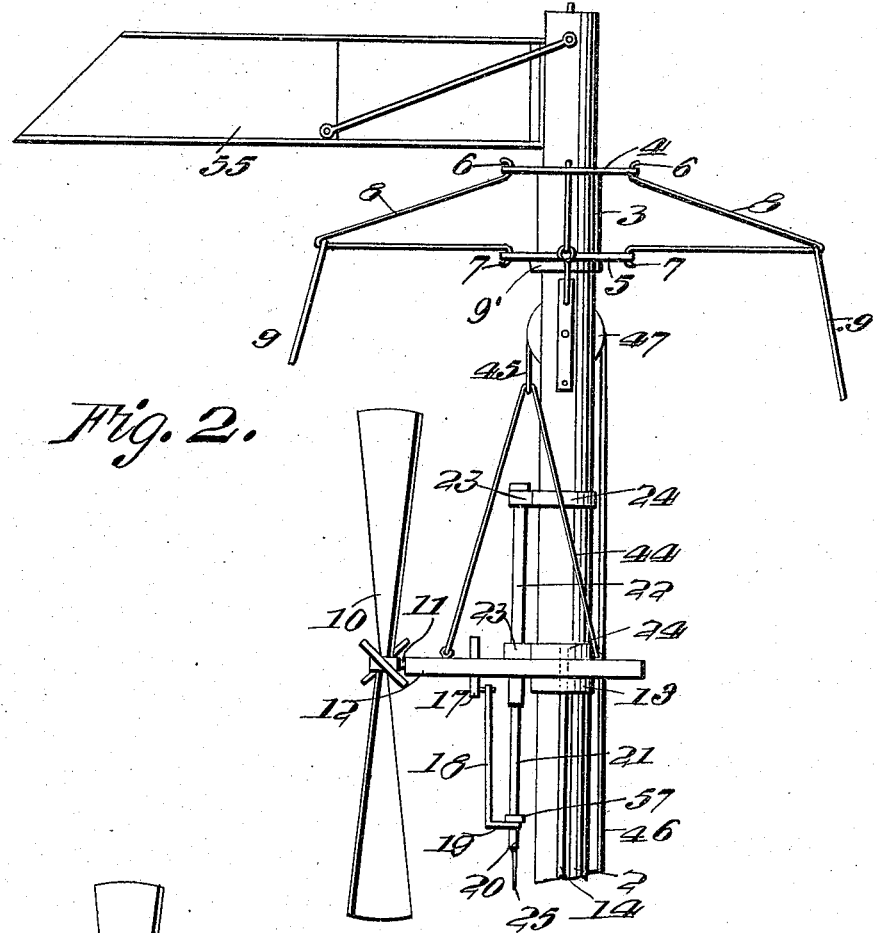
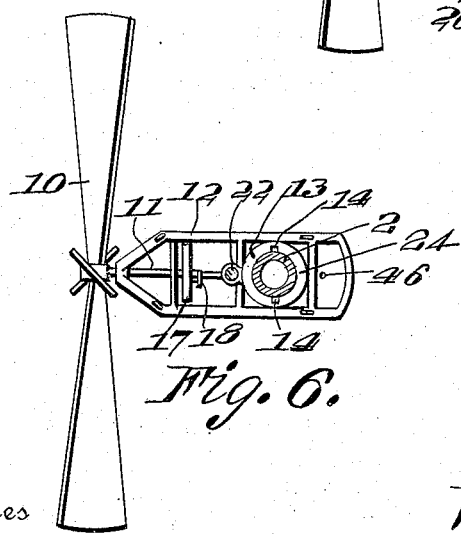

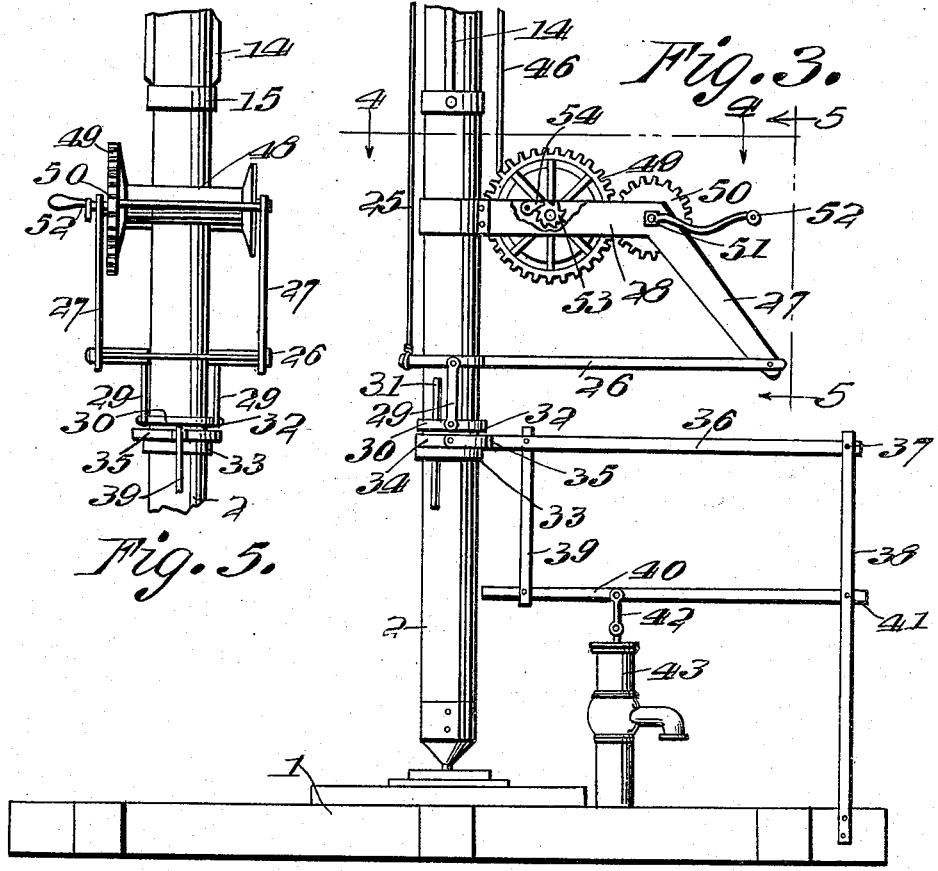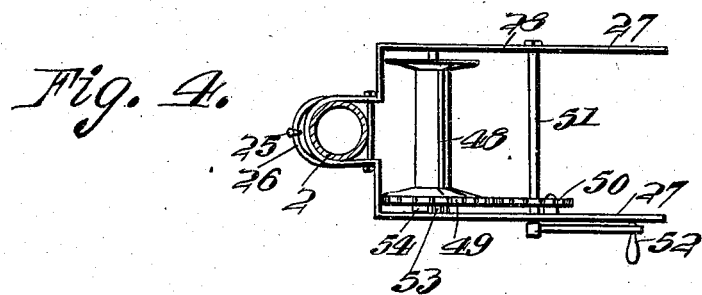

WILLIAM HOPPER, OF JEFFERSON, IOWA.

WINDMILL-TOWER.

939,504.

Specification of Letters Patent. Patented Nov. 9, 1909.

Application filed May 17, 1909. Serial No. 496,340.

*To all whom it may concern:*

Be it known that I, WILLIAM HOPPER, a citizen of the United States, residing at Jefferson, in the county of Greene and State of Iowa, have invented certain new and useful Improvements in Windmill-Towers; and I do declare the following to be a full, clear, and exact description of the invention, such as will enable others skilled in the art to which it appertains to make and use the same.

This invention relates to a windmill tower and pump operating mechanism and has for its object to provide an improved form of mechanism for operating the pump.

A particular object of this invention is to arrange suitable mechanism on the tower whereby the windwheel and coöperative parts may be lowered for oiling or repairing without climbing the tower.

A further object of the invention is to provide means whereby the windmill may be moved into and out of position for operating the pump operating means in order that the pump may be thrown into or out of operation as desired.

A further object is to provide improved means for supporting the windmill tower and for bracing the upper end thereof.

With these and other objects in view, the invention consists of certain novel features of construction, combination and arrangement of parts, as will be more fully described and particularly pointed out in the appended claims.

In the accompanying drawings, Figure 1 is an elevation of a windmill tower with the windmill frame and pump driving mechanism mounted thereon; Fig. 2 is a fragmentary view of the upper end of the tower and the wind wheel frame; Fig. 3 is a similar view of the lower portion of the tower and a portion of the pump driving mechanism; Fig. 4 is a horizontal section taken on line 4—4 of Fig. 3; Fig. 5 is a vertical section taken on line 5—5 of Fig. 3; and Fig. 6 is a horizontal section taken through the tower at a point immediately above the wind wheel frame.

Referring to the drawings for a more particular description of the invention, 1 indicates the supporting frame which may be of any suitable construction and 2 the tower which is revolubly mounted thereon and is preferably made of gas pipe. The upper end of the tower is braced by a collar 3, having upper and lower flanges 4 and 5, respectively, with which are engaged the upper and lower hooked ends 6 and 7 of the bent brace rods 8, the centers of which are connected with the ground by the guy cables 9. The collar 3 rests on the ring 9' which is bolted to the tower 2. The wind wheel 10 has its shaft 11 mounted in the frame 12 which, as shown, is of approximately rectangular form and is provided with a cylindrical body 13, mounted to slide upon the guide bars 14, screwed or otherwise attached to the tower 2. The inner end of the wind wheel shaft is provided with the crank wheel 17, to which is eccentrically connected the upper end of the pitman 18. The lower end of the pitman is provided with a loop, 19, which, when the wind wheel frame is in operative position, receives the lower end 20 of the vertically movable operating rod 21, having the upper enlarged portion or body 22, which is mounted to slide vertically through the loops 23 of the upper and lower guide bars 24.

The operating cable, 25, is connected to the lower end, 20, of the operating rod, 21, at its upper end, and has its lower end connected to the center of an operating yoke, 26. In practice, the ends of the yoke, 26, are pivoted to the legs, 27, of the frame, 28, which encircles the tower and is securely bolted thereto. The side pieces of the operating yoke are connected by the links, 29, with the collar, 30, which is mounted to slide vertically upon the tower and is held against rotary movement thereon by the guide bar, 31, which is received by a recess in the inner surface of the collar. This collar is provided with the upper and lower flanges, 32 and 33, respectively, between which is arranged the spliced ring, 34, which is connected by the fork, 35, with the horizontal operating bar, 36, pivoted at its outer end as at 37, to the upright support, 38.

A vertical operating bar or link, 39, is disposed between the inner end of the bar, 36, and a second lower horizontal operating bar, 40, which is also pivoted at its outer end as at 41, to the support, 38, and is connected near its inner end with the piston rod, 42, of the pump, 43. The side pieces of the wind wheel frame, 12, are connected by means of the rods 44, with the upper end, 45, of the operating cable, 46, which passes over a pulley, 47, suitably mounted upon the tower above the upper collar, 16. This operating cable, after passing over the pulley, 47, passes downwardly and winds upon the windlass, 48, which is mounted in the frame, 28.

To facilitate the winding of the operating cable upon the windlass, the latter is provided with the gear, 49, which intermeshes with the winding pinion, 50, arranged near one end of the shaft, 51, which extends through the side pieces of the frame, 28. This shaft is provided with an operating handle, 52, for turning the pinion, while the gear shaft is provided with the pawl and ratchet, 53 and 54, respectively, to prevent retrograde movement of the windlass.

The extreme upper end of the tower is provided with the tailboard, 55, to cause the tower to turn with the wind.

56 indicates an arrow which is arranged above the upper end of the tower for indicating the direction in which the wind is blowing.

In practice, when it is desired to throw the pump, 43, into operation, the handle, 52, is turned to wind the operating cable, 46, upon the windlass, when the wind wheel frame is caused to slide vertically upon the tower until brought into operative position or until the loop, 19, of the pitman, 18, engages the shoulder, 57, near the lower end of the operating rod, 21, and consequently at each revolution of the wind wheel shaft, the operating rod is raised, which, through the medium of the cable, 25, operating yoke, 26, links, 29 and the various other heretofore described connections, operates the pump.

From the foregoing description, taken in connection with the accompanying drawings, the construction and operation of the invention will be readily understood without requiring a more extended explanation.

Various changes in the form, proportion and the minor details of construction, may be resorted to without departing from the principle or sacrificing any of the advantages of this invention.

Having thus described my invention, what I claim is:—

1. In a device of the class described, a base, a tower rotatably mounted thereon, a wind wheel frame slidably mounted on the tower, means for raising the frame, a pivoted yoke mounted near the lower end of the tower, a vertical operating rod mounted near the upper end of the tower, a connection between said rod and the free end of said yoke, a crank wheel on the wind wheel shaft, a pitman connected with the crank wheel and having a loop to receive the operating rod, a shoulder on the operating rod to form a stop for the loop of the pitman, and connections between the yoke and the pump for operating the latter, when the wind wheel and its frame are in extreme raised or operative position.

2. In a device of the class described, a base, a tower rotatably mounted thereon, a wind wheel frame slidably mounted on the tower, a wind wheel mounted in said frame, manually operated means for raising the wind wheel frame, a pivoted yoke near the lower end of the tower, a collar slidably mounted on the tower beneath the yoke, links between the yoke and collar, a vertical operating rod mounted near the upper end of the tower, a flexible connection between the operating rod and the pivoted end of the yoke, a crank wheel on the wind wheel shaft, a pitman connected with the crank wheel and having a loop to receive the lower end of the operating rod when the wind wheel frame is in raised or operative position, a shoulder forming a stop on the lower end of the operating rod, and connections between the collar and the pump for operating the latter when the wind wheel frame is in operative position.

In testimony whereof I have hereunto set my hand in presence of two subscribing witnesses.

WILLIAM HOPPER.

Witnesses:
A. D. HOWARD,
R. G. HOWARD.